United States Patent [19]
Raj et al.

[11] Patent Number: 5,452,520
[45] Date of Patent: Sep. 26, 1995

[54] FERROFLUID INCLINOMETER

[75] Inventors: Kuldip Raj, Merrimac; Christian Ionescu, Nashua, both of N.H.

[73] Assignee: Ferrofluidics Corporation, Nashua, N.H.

[21] Appl. No.: 212,273

[22] Filed: Mar. 14, 1994

[51] Int. Cl.[6] ............................................. G01C 9/06
[52] U.S. Cl. ............................................. 33/366; 33/365
[58] Field of Search .............. 33/366, 365; 340/689; 324/207.2, 207.24

[56] References Cited

U.S. PATENT DOCUMENTS

| | | | |
|---|---|---|---|
| 2,912,767 | 11/1959 | Mittelman | 33/366 |
| 2,958,137 | 11/1960 | Mueller | 33/366 |
| 3,059,343 | 10/1962 | Kermode | 33/366 |
| 3,083,469 | 4/1963 | Herbst | 33/366 |
| 3,421,227 | 1/1969 | Turner et al. | 33/366 |
| 4,277,895 | 7/1981 | Wiklund | 33/366 |
| 4,557,056 | 12/1985 | Kinetal | 33/366 |
| 4,614,041 | 9/1986 | Darton et al. | 33/313 |
| 4,667,414 | 5/1987 | Russell | 33/364 |
| 4,676,103 | 6/1987 | Nakajima | 73/516 |
| 4,707,927 | 11/1987 | Hiyama | 33/366 |
| 4,803,426 | 2/1989 | Odagawa et al. | 324/207 |
| 4,821,423 | 4/1989 | Adams | 33/366 |
| 4,885,535 | 12/1989 | Odagawa et al. | 324/207 |

FOREIGN PATENT DOCUMENTS

| | | | |
|---|---|---|---|
| 0128221 | 5/1988 | Japan | 33/366 |
| 0121707 | 5/1988 | Japan | 33/366 |
| 0821916 | 4/1981 | U.S.S.R. | 33/366 |
| 2201246 | 8/1988 | United Kingdom . | |
| 8504708 | 10/1985 | WIPO | 33/366 |

OTHER PUBLICATIONS

DeSabata et al., "Inductive Transducers With Magnetic Fluids," 32 *Sensors And Actuators A* 678 (1992) No Month.

*Primary Examiner*—Thomas B. Will
*Attorney, Agent, or Firm*—Bookstein & Kudirka

[57] ABSTRACT

An inclinometer device containing a magnet surrounded at each pole by a thin, discrete band of ferrofluid; these bands are retained against the magnet by its own magnetic field, and suffice to suspend the magnet within a nonmagnetic housing that may be open or closed to the atmosphere. In a first embodiment, a Hall element senses the axial position of the magnet, and a pair of inductor coils, positioned on opposite sides of the neutral point and configured to generate opposing magnetic fields, counteract the magnet's movement and restore it to the neutral position upon application of an appropriate electric current. The magnitude and direction of this restorative current indicate the extent and orientation of the tilt. In a second embodiment, the axial position of the magnet is sensed by a pair of split capacitors disposed on the housing and spaced apart from one another. A coil centered between the capacitors restores the magnet to its neutral position, and once again the magnitude and direction of the coil current is used to gauge the degree and orientation of incline.

10 Claims, 6 Drawing Sheets

FERROFLUID INCLINOMETER

BACKGROUND OF THE INVENTION

1. Field of the Invention

The present invention relates to measurement of horizontal incline, and more particularly to an inclinometer that generates a measurement signal based on position equilibration of a magnetic element.

2. Description of the Related Art

Incline-measurement instruments find application in a wide variety of industrial and research environments. For example, geotechnical engineers utilizes these devices to track the underground boring tools employed in oil prospecting, well construction, and the installation of subterranean pipes and cables, while numerous types of aerospace, automotive, and robotic equipment incorporate inclinometers as standard components.

Because traditional mechanical inclinometers must take into account the effects of friction, which would otherwise distort measurement signals generated by elements responsive to the force of gravity, more modern designs frequently utilize mobile elements fully bathed in a liquid. Magnetic elements, for example, are often suspended in ferrofluids—i.e., colloids that contain suspended magnetic particles and which respond to an applied magnetic field as if the fluid itself possessed homogeneous magnetic characteristics. Various measurement arrangements have been employed to detect movement of a magnet floating within a ferrofluid sheath or to measure the force exerted on such an element by gravity, and to derive therefrom a signal indicative of the degree of tilt.

Unfortunately, the requirement of immersing a measurement element in a liquid imposes design limitations. First, such an inclinometer device must remain fully sealed to prevent escape of the liquid. Second, response times necessarily depend on the viscosity of the liquid within which the element moves, a factor that can prove critical in high-performance applications. And depending on the volumes involved, to be fully submerged a mobile magnetic element can require a considerable amount of ferrofluid, adding cost to the device.

DESCRIPTION OF THE INVENTION

BRIEF SUMMARY OF THE INVENTION

We have discovered that it is unnecessary to fully bathe a mobile magnetic element in a ferrofluid to obtain highly accurate incline measurements. Instead, we surround each pole of the magnet with a thin, discrete band of ferrofluid; these bands are retained against the magnet by its own magnetic field, and suffice to suspend the magnet within a housing that may be open or closed to the atmosphere. Even with a closed housing, however, travel of the magnet in our inclinometer design is not significantly impeded by the bulk viscosity of the ferrofluid, as is typically the case in the prior art, since fluid surrounds only a small portion of the magnet surface. We nonetheless retain the benefit of a measurement design free of possible distortion by friction.

In a first embodiment, a Hall element senses the axial position of a magnet suspended within a nonmagnetic housing by two polar bands of ferrofluid. Tilting of the device causes the magnet to move away from its neutral or rest position, which corresponds to zero incline. A pair of inductor coils, positioned on opposite sides of the neutral point and configured to generate opposing magnetic fields, counteract the magnet's movement and restore it to the neutral position upon application of an appropriate electric current. The magnitude and direction of this restorative current indicate the extent and orientation of the tilt. In a representative operating environment, the Hall element is coupled to a feedback circuit that supplies the coils with current and generates a measurement signal.

In a second embodiment, the axial position of the magnet is sensed by a pair of split capacitors disposed on the housing and spaced apart from one another. At the neutral point, located between the capacitors, opposite ends of the magnet extend equal distances between the plates of the respective capacitors. Movement of the magnet disrupts this symmetry, introducing a greater portion of the magnet inside one capacitor and withdrawing a corresponding portion from the other capacitor, altering their respective capacitances. A coil centered between the capacitors restores the magnet to its neutral position, and once again the magnitude and direction of the coil current is used to gauge the degree and orientation of incline.

In both embodiments, friction does not interfere with the accuracy of measurement (or more precisely, with the relationship between tilt angle and the applied current necessary to restore the magnet to a neutral position) since the magnet is fully suspended on a liquid, which cannot support a tangential force.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
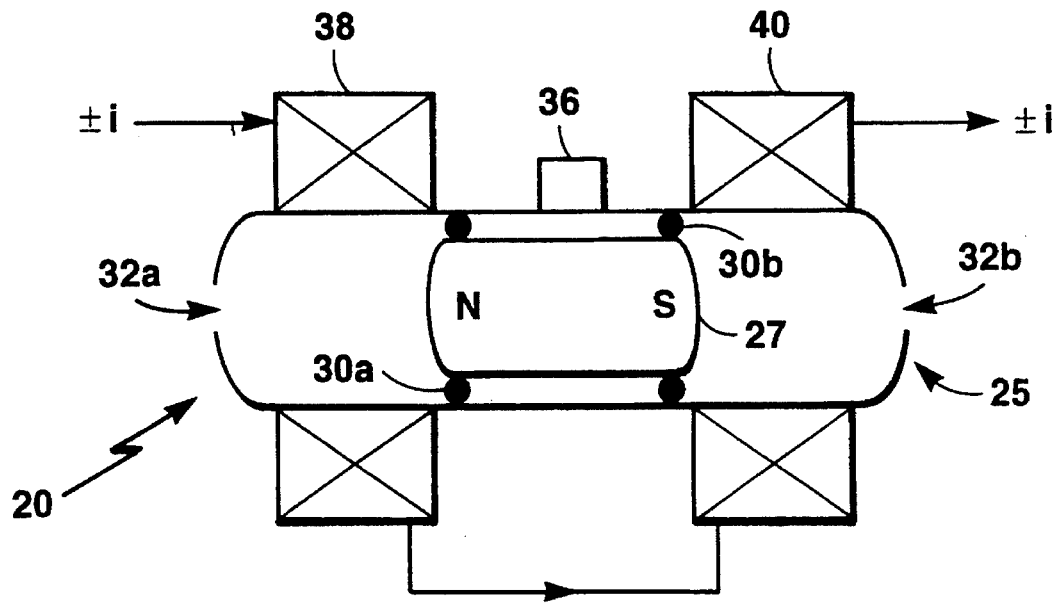
FIG. 1 is a sectional view of the first embodiment of the invention.

Refer first to FIG. 1, which illustrates the components of the first embodiment of the invention, indicated generally by reference numeral 20. The inclinometer 20 includes a hollow, nonmagnetic housing 25, which surrounds an axially polarized, permanent magnet 27 whose transverse dimensions substantially match the interior conformation of housing 25, but are slightly (preferably on the order of several thousandths of an inch) smaller; magnet 27 is therefore free to move axially within housing 25. Housing 25 may be fabricated from any structurally stable material that does not exhibit significant responsiveness to an applied magnetic field; plastic, glass, aluminum and nonmagnetic steel represent suitable materials.

Surrounding magnet 27 at each of its poles (indicated in the figure by N and S designations) is a thin, discrete band of ferrofluid 30a, 30b. The ferrofluid may be an ester, fluorocarbon, synthetic-hydrocarbon, silahydrocarbon or silicon formulation; in particular, we have obtained worthwhile results using the TPG11 product marketed by Ferrofluidics Corp., Nashua, N.H., which has a magnetization of 400 Gauss and a viscosity of 20–25 centipoises, in conjunction with a cylindrical Alnico 5 magnet approximately 8 mm in length and 3 mm in diameter, and a magnetic flux of 1600 Gauss at the faces of the magnet. The characteristics of the ferrofluid and magnet 27 are related. If the magnet has a relatively low magnetic field, it is necessary to use a ferrofluid of relatively high magnetization in order to achieve the necessary levitation (as described below). The magnetic field of magnet 27 can range, for example, from 500–4000 Gauss, and the magnetization of the ferrofluid from 50–400 Gauss.

Bands 30a, 30b are concentrated at the poles of magnet 27, and each preferably does not occupy more than 30% of its axial length. Indeed, depending on the magnetization of the ferrofluid and the magnetic field of magnet 27, these bands will form naturally upon application of ferrofluid to the magnet.

Ferrofluid bands 30a, 30b make contact with the inner wall of housing 25 and suspend magnet 27 therein. This contact is substantially frictionless when magnet 27 is at rest and nearly so during movement. Magnet 27 therefore slides freely within housing 25 (with ferrofluid bands 30a, 30b functioning as bearings fixedly retained against magnet 27 by its magnetic field). A further feature supporting free magnet movement is a pair of apertures 32a, 32b, each located at an end of housing 25. These prevent the buildup of air pressure that would occur as a result of, and also counteract, movement of magnet 27 if housing 25 were sealed. Apertures 32a, 32b are preferably quite small relative to the cross-section of the housing (e.g., with a housing of 4 mm cross-section, each aperture need be no larger than 1 mm) to minimize the loss of ferrofluid carrier from evaporation should the device be exposed to elevated temperatures.

Figure 2:
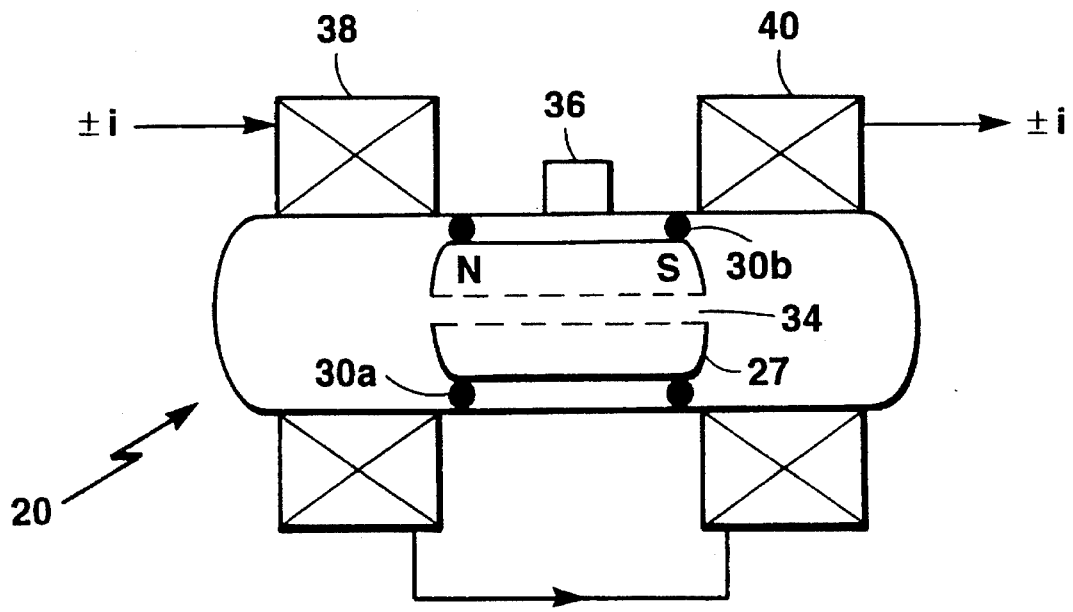
FIG. 2 is a sectional view of another version of the first embodiment, which contains an alternative pressure-equalizing feature.

Alternative means for avoiding pressure buildup are also possible. As shown in FIG. 2, for example, the solid magnet 27 can be replaced with a hollow version containing an axial bore 34 therethrough, which vents air from one end of housing 25 to the other as magnet 27 slides. In this way, it is possible to employ a sealed housing while retaining the benefits of pressure equalization. Water-based ferrofluids, which evaporate quickly when exposed to air, may be advantageously utilized with this sealed design.

Disposed on the outer surface of housing 25, at a location (preferably the axial center) representing the neutral magnet position, is a Hall element 36. This semiconductor device exploits the Hall effect, producing an output voltage proportional to the product of the current passing through it and net magnetic flux perpendicular to it. When Hall element 36 is located opposite the axial center of magnet 27, it registers a magnetic field of zero net magnitude. Movement of magnet 27 away from its neutral or equilibrium position (corresponding to zero incline) results in a nonzero magnetic field through Hall element 36, producing a corresponding voltage that reflects both the degree of magnet movement (since increasing proximity to one of the poles increases the sensed magnetic field) and its direction (since magnetic polarity determines the polarity of the Hall voltage).

Also surrounding housing 25 are a pair of coils 38, 40. The coils each comprise a series of conductive windings, and are identical to one another in inner and outer diameter, width and number of turns. The coils are connected in series and wound in opposite directions so that they produce equal but opposite magnetic fields when energized. Coils 38 and 40 are spaced apart from one another along housing 25 by a distance approximately equal to the axial length of magnet 27.

Figure 3:
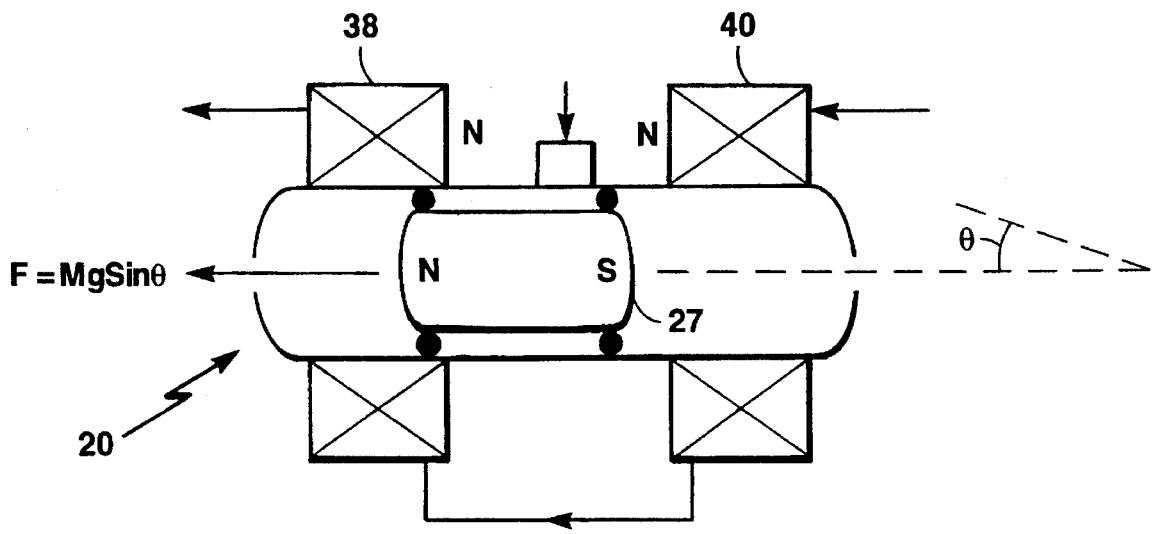
FIG. 3 is a sectional view of the first embodiment, showing the effect of a tilt from horizontal.

Refer now to FIG. 3, which illustrates the invention's mode of operation when the device 20 is inclined at an angle $\theta$ to the horizontal. The axial force F acting on magnet 27 is equal to Mgsin $\theta$, where M is the mass of the magnet and g is the acceleration due to gravity. Force F displaces magnet 27 away from its neutral position. No longer located precisely opposite magnetic poles, Hall element 36 now registers a net magnetic field and produces a corresponding voltage. A current i is therefore applied to the windings of coils 38 and 40 to restore magnet 27 essentially to its equilibrium position. The direction of current i is such that coil 38 repels the leading pole of magnet 27 and coil 40 attracts the trailing pole; thus in the exemplary configuration shown in FIG. 3, where north is the leading pole, the applied current induces equal but opposing north magnetic poles at the inner faces of coils 38, 40. The magnitude of current i is proportional to the force necessary to counter F and, therefore, to sin $\theta$.

If the device 20 is tilted in the opposite direction, the voltage produced by Hall element 36 is opposite in sign and the direction of current i is reversed; because south is now the leading pole of magnet 27, south magnetic poles are created at the inner faces of coils 38, 40 to restore magnet 27 to its neutral position.

Figure 4:
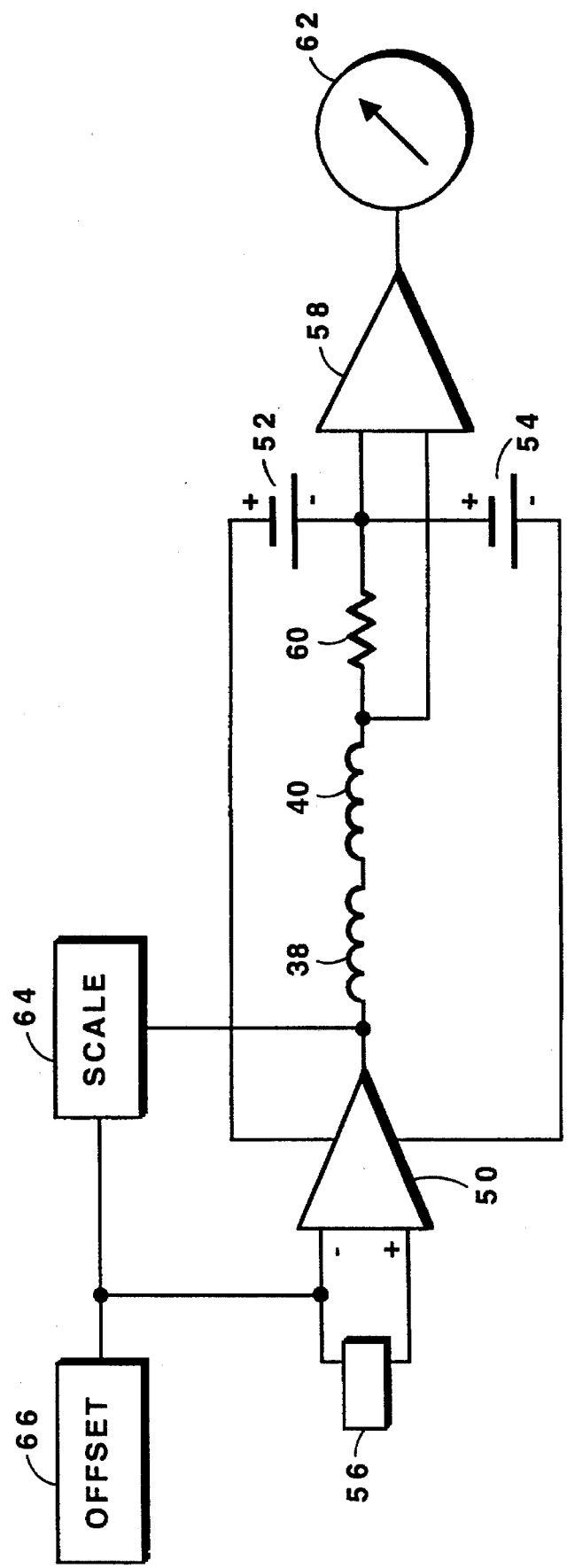
FIG. 4 schematically depicts a suitable circuit for obtaining incline measurements using the first embodiment of the present invention.

A suitable feedback circuit for operating the device 20 in the manner described is illustrated in FIG. 4. The circuit includes a high-gain servo amplifier 50, which is powered by a pair of batteries (or other power sources) 52, 54. Battery, 52 supplies a positive voltage with respect to ground, and battery 54 supplies a negative voltage, enabling servo amplifier 50 to produce an output of positive or negative polarity. Hall element 36 is connected to the input terminals of servo amplifier 50. The output of the amplifier 50 passes through coils 38 and 40, supplying the current (of the appropriate polarity) necessary to restore magnet 27 to its neutral position. In the illustrated embodiment, the high gain of servo amplifier ensures that magnet 27 will be retained at a position close to the neutral point, since even a slight Hall voltage is sufficient to produce a large amplified output to coils 38, 40. (Retention of magnet 27 precisely at the neutral position is impossible, however, since this corresponds to zero Hall voltage and zero amplifier output.) Alternatively, the output of servo amplifier 50 can be connected to an integrator, which will allow magnet 27 to be retained precisely at the neutral position by providing the necessary current to coils 38, 40 notwithstanding the zero output of Hall element 36.

The output terminal of coil 40 is delivered to one input terminal of a readout amplifier 58, and also to a resistor 60, which is connected to the other input terminal of readout amplifier 58 and to the junction between batteries 52, 54 (corresponding to zero voltage, or ground). Readout amplifier 58 amplifies the voltage drop across resistor 60 and drives a readout meter 62, which thus indicates the magnitude and polarity of current flowing through coils 38, 40 and, hence, the degree of incline.

A scaling circuit 64 (for example, a series of individually selectable resistors) connected between the output of servo amplifier 50 and its inverting input terminal alters the degree of amplification of the amplifier. Adjustment of scaling circuit 64 effectively allows selection of the range of incline angles reported by meter 62. This permits the user both to choose the output precision and to accommodate the dynamic range of amplifiers 50 and 58, which may not otherwise be capable of accommodating the full range of measurable inclines.

An offset power source 66 (which may be, for example, a battery), fed through a variable resistor) permits the circuit to be calibrated to a meter reading of zero on a perfectly level surface.

Figure 5A:
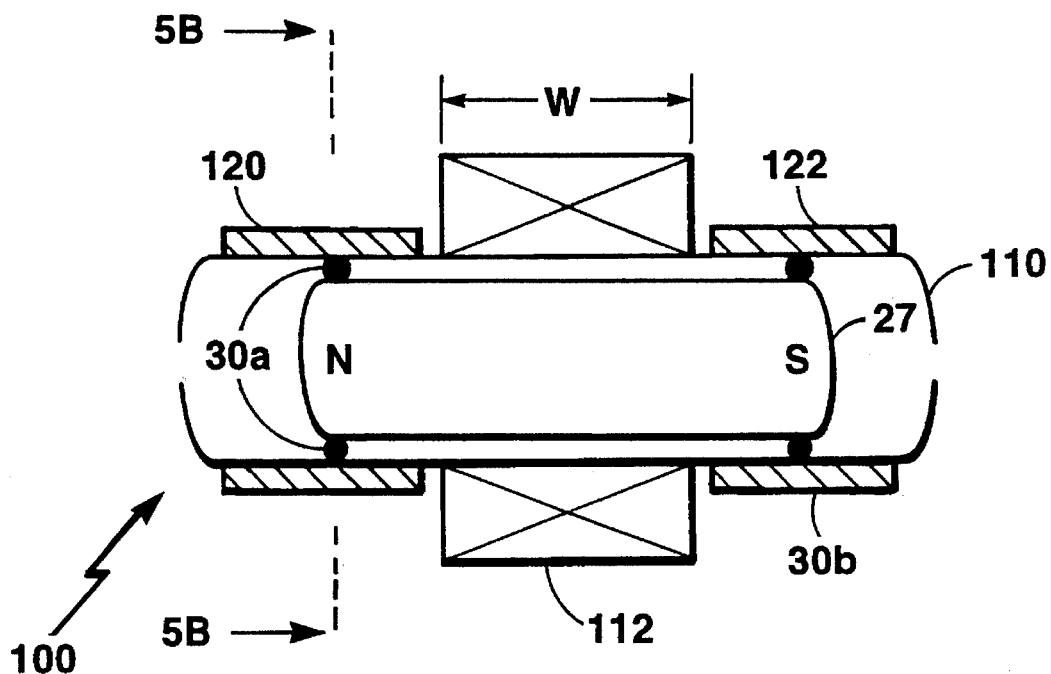
FIG. 5A is a sectional view of a cylindrical version of the second embodiment of the invention.
Figure 5B:
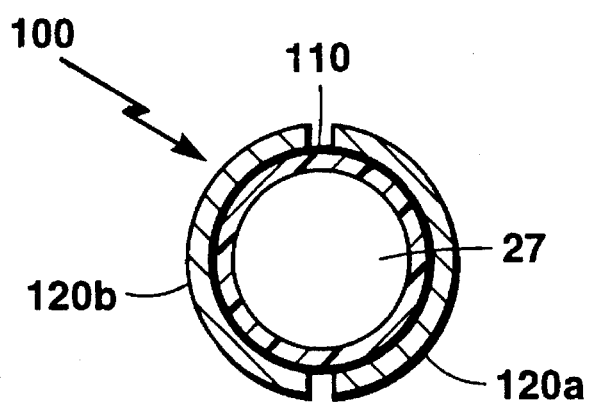
FIG. 5B is a cross-sectional view of the embodiment depicted in FIG. 5A, taken along the line 5B—5B.

Refer now to FIGS. 5A and 5B, which collectively illustrate the components of the second embodiment of the invention, indicated generally by reference numeral 100. The inclinometer 100 once again includes a hollow, non-magnetic housing 110, which also functions as a dielectric. Suitable materials for housing 110 include, for example, plastic, glass or silica. The interior elements of the inclinometer are identical to those described in connection with FIGS. 1 and 2.

Figure 6:
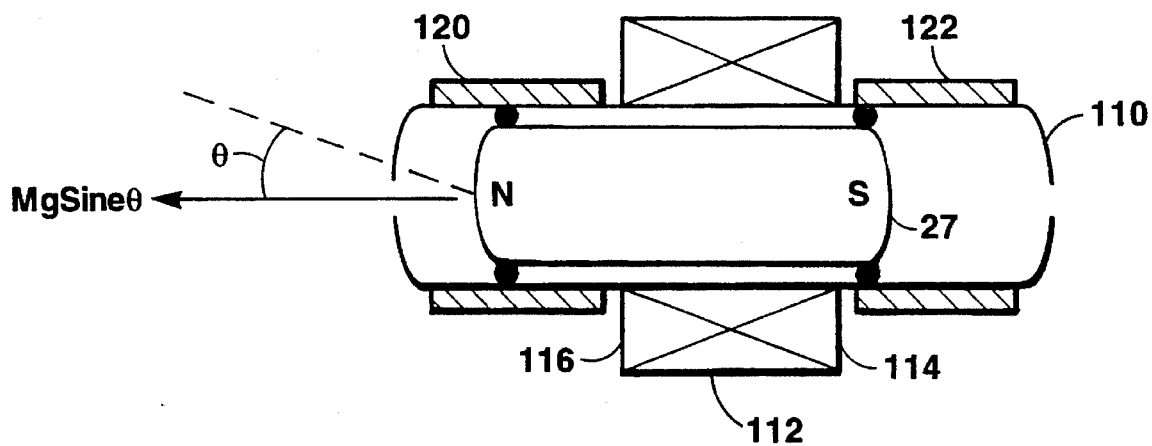
FIG. 6 is a sectional view of the second embodiment, showing the effect of a tilt from horizontal.

Disposed on the outer surface of housing 25, at a location at or near the axial center, is an inductor coil 112, whose width w preferably does not exceed, and is desirably smaller than the axial extent of magnet 27. When the device 100 is inclined and magnet 27 displaced, coil 112 is energized with a current appropriate in magnitude and direction to restore magnet 27 to the neutral position. For example, with the device 100 tilted as shown in FIG. 6, a south magnetic pole would be created at the right face 114 and a north magnetic pole at the left face 116.

The position of magnet 27 within housing 110, and therefore the magnitude and direction of current that must be passed through coil 112, is sensed by a pair of identical split capacitors 120, 122 of equal value disposed on housing 110 at opposite sides of coil 112. Each split capacitor 120, 122 comprises a pair of separate metal plate halves that each conform to the outer dimension of housing 110. For example, using a cylindrically shaped housing 110, the plate halves, indicated by reference numerals 120a and 120b in FIG. 5B, extend substantially (but not entirely) around the outer diameter of housing 110. Plates 120a, 120b may be formed, for example, by wrapping metal (e.g., aluminum foil) around housing 110, or by electroplating or sputtering a metallic material onto its surface.

At the neutral point, an equal axial length of magnet 27 extends within each capacitor 120, 122. Tilting of the device 100 introduces a greater portion of magnet 27 within one capacitor and withdraws a corresponding portion from the other capacitor, altering their respective capacitances. Specifically, with a metal magnet 27, tilting of the device 100 as shown in FIG. 6 increases the capacitance of capacitor 120, since more of magnet 27 (and less air) occupies the space between plates 120a and 120b, and decreases the capacitance of capacitor 122 by an equivalent amount.

Figure 7:
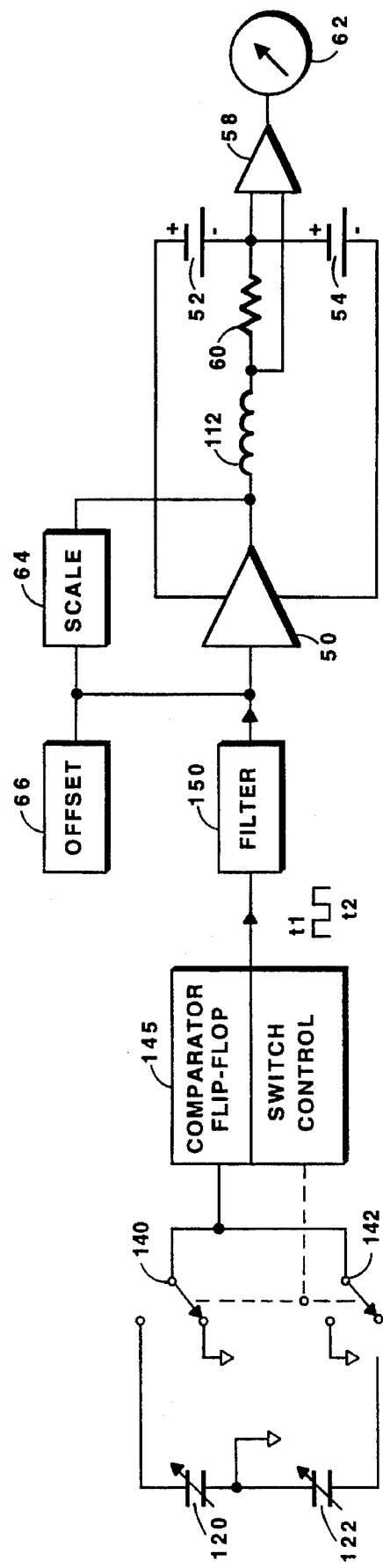
FIG. 7 schematically depicts a suitable circuit for obtaining incline measurements using the second embodiment of the present invention.

A suitable feedback circuit for operating this embodiment of the invention appears in FIG. 7. The differential capacitances of the two sensing capacitors 120, 122 are exploited through pulse-width modulation to produce an output signal representative of the position of magnet 27. This signal is amplified to restore the magnet to the neutral position and indicate the degree of tilt.

Specifically, the circuit comprises a pair of solid-state switches 140, 142, which alternately connect one of capacitors 120, 122 to the input terminal of a comparator/flip-flop module and the other to ground. Switches 140, 142 operate simultaneously, and although shown schematically as separate components, they actually reside within the comparator/flip-flop module 145 (as indicated by the legend "Switch Control").

Comparator/flip-flop 145 reverses the positions of switches 140, 142 when its input voltage reaches a predetermined reference value. A power supply (not shown) powers comparator/flip-flop 145, provides a comparator reference voltage and charges, through an internal resistance, the ungrounded capacitor 140 or 142. With the switches set as shown in the figure, capacitor 120 remains discharged while capacitor 122 charges. When the voltage at the input terminal of comparator/flip-flop 145 reaches the predetermined value, after a time $t_1$ that depends on the capacitance of capacitor 122 (and hence the position of magnet 27 within housing 110), the switches flip positions, instantaneously discharging capacitor 122 and allowing capacitor 120 to charge. After a time $t_2$, which depends on the capacitance of capacitor 120 (and, once again, the position of magnet 27 within housing 110), the voltage at the input terminal of comparator/flip-flop 145 reaches the predetermined value and the switches again flip.

Figure 8:
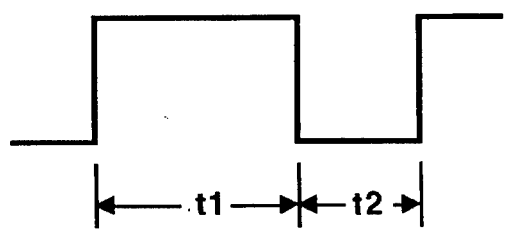
FIG. 8 illustrates the varying pulse widths produced by the second embodiment of the invention when installed in the circuit illustrated in FIG. 7.

The output of comparator/flip-flop 145 oscillates between fixed reference voltages (most conveniently, the supply voltage and ground) as the switches change position. The output is therefore a square wave, as shown in FIG. 8, with a period $t_1 + t_2$ that depends on the capacitances of capacitors 120, 122, the charging voltage and the internal charging resistance. The pulse widths of the individual wave components $t_1$ and $t_2$ reflect, respectively, the capacitances of capacitors 120, 122. Averaging the square wave by means of a low-pass filter 150 provides a dc signal whose level is proportional to the ratio $t_1 / t_2$, and which therefore accurately indicates the position of magnet 27 within housing 110. The signal from low-pass filter 150 is at its midpoint when magnet 27 resides in the neutral position, since $t_1 = t_2$. Signal levels above or below the midpoint level correspond to leftward or rightward tilts.

The output of low-pass filter 150 is fed to the feedback and measurement circuit described earlier, which provides current to coil 112 so as to restore magnet 27 to its neutral position. The magnitude and polarity of that current, registered on meter 62, indicates the degree and direction of tilt.

Offset power source 66, which was previously used to calibrate measurement, can in this circuit be employed to shift the voltage range of the dc signal from low-pass filter 150. For example, if that signal varies between some positive voltage and ground, a negative offset voltage shifts the signal midpoint (corresponding to zero tilt) to ground. Leftward and rightward tilts then produce voltages of opposite polarities, while the absence of an incline results in no input voltage to servo amplifier 50 and hence no current to coil 112.

It will therefore be seen that we have developed a convenient, highly responsive and accurate inclinometer system that may be used in a wide variety of environments. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An inclinometer device comprising:
   a. a nonmagnetic housing having an interior dimension and an interior wall having a perimeter;
   b. an elongated, axially polarized magnet disposed within the housing, and having a transverse dimension smaller than the interior dimension of the housing;
   c. a thin, discrete band of ferrofluid surrounding the magnet at each pole and in contact with the entire perimeter of the interior wall of the housing so as to suspend the magnet coaxially within the housing and seal the magnet against the interior wall;
   d. means for sensing displacement of the magnet from a rest position;
   e. feedback means, coupled to the sensing means, for exerting sufficient force on the magnet to return it to the rest position; and
   f. means for measuring the exerted force and generating therefrom an incline measurement.

2. The device of claim 1 further comprising means for equalizing the pressure at both ends of the magnet.

3. The device of claim 1 wherein the displacement-sensing means is a Hall element disposed outside the housing.

4. The device of claim 3 wherein the magnet has an axial length and the feedback means comprises:
   a. a first inductance coil surrounding the housing;
   b. a second inductance coil surrounding the housing and of substantially identical physical dimension with respect to the first coil but oppositely wound; and
   c. means for delivering a controlled electric current to the coils,
   wherein the coils are separated from one another along the housing by at least the axial length of the magnet.

5. The device of claim 1 wherein:
   a. the magnet has an axial length;
   b. the housing is a dielectric material; and
   c. the displacement-sensing means comprises two split capacitors disposed on the housing and separated from one another along the housing by no more than the axial length of the magnet.

6. The device of claim 5 wherein the feedback means comprises:
   a. an inductance coil surrounding the housing; and
   b. means for delivering an electric current of controlled magnitude and direction to the coil.

7. The device of claim 2 wherein the pressure-equalizing means is an axial hole through the magnet.

8. The device of claim 2 wherein the housing has two ends and the pressure-equalizing means is an aperture through each end.

9. The device of claim 1 wherein:
   a. the magnet has an axial length; and
   b. the ferrofluid bands each occupy no more than 30% of the axial length of the magnet.

10. The device of claim 1 wherein the ferrofluid is selected from the group consisting of ester, fluorocarbon, synthetic-hydrocarbon, silahydrocarbon and silicon ferrofluids.

* * * * *